United States Patent
De Vos et al.

(10) Patent No.: US 9,909,088 B2
(45) Date of Patent: Mar. 6, 2018

(54) METHOD FOR ISOMERISATION OF HOP ALPHA-ACIDS TO ISO-ALPHA-ACIDS

(75) Inventors: Dirk De Vos, Holsbeek (BE); Pascal Mertens, Heverlee (BE)

(73) Assignee: IFAST NV, Roosdaal (BE)

( * ) Notice: Subject to any disclaimer, the term of this patent is extended or adjusted under 35 U.S.C. 154(b) by 607 days.

(21) Appl. No.: 13/876,915

(22) PCT Filed: Sep. 29, 2011

(86) PCT No.: PCT/EP2011/067055
§ 371 (c)(1),
(2), (4) Date: Apr. 8, 2013

(87) PCT Pub. No.: WO2012/041994
PCT Pub. Date: Apr. 5, 2012

(65) Prior Publication Data
US 2013/0209653 A1 Aug. 15, 2013

(30) Foreign Application Priority Data
Sep. 30, 2010 (GB) .................................. 1016430.9

(51) Int. Cl.
*C12C 3/12* (2006.01)
(52) U.S. Cl.
CPC ...................................... *C12C 3/12* (2013.01)
(58) Field of Classification Search
CPC ....................................................... C12C 3/12
USPC ........................................................ 426/600
See application file for complete search history.

(56) References Cited

U.S. PATENT DOCUMENTS 5,387,425 A * 2/1995 Hsu ........................... C12C 3/08
426/329

FOREIGN PATENT DOCUMENTS

| CA | 993385 | 7/1976 |
| EP | 2055766 A1 | 5/2009 |
| FR | 2174815 | 8/1972 |
| WO | 9315181 A1 | 8/1993 |
| WO | 2012041994 A1 | 4/2012 |

OTHER PUBLICATIONS

XP-002665014.

* cited by examiner

*Primary Examiner* — Vera Stulii
(74) *Attorney, Agent, or Firm* — Gianna Julian-Arnold; Saul Ewing Arnstein & Lehr LLP

(57) ABSTRACT

The invention relates to a process for the production of iso-alpha-acids starting from alpha-acids in which an alpha-acid containing hop extract is mixed with a carbon-containing chemical compound with one or more functional groups containing a (basic) nitrogen atom with a lone pair (or mixtures thereof), either in solvent-free conditions or in the presence of solvents and preferably under an oxygen-free atmosphere. The resulting mixture is subjected to a temperature of at least 278 K for a time sufficient to effect the intended conversion of the alpha-acid reactant into the iso-alpha-acid product. The present invention further relates to iso-alpha-acid compositions obtained by said improved isomerisation process and to the use of said iso-alpha-acid compositions as bittering formulation and/or as source to obtain reduced or hydrogenated iso-alpha-acid compositions.

18 Claims, No Drawings

METHOD FOR ISOMERISATION OF HOP ALPHA-ACIDS TO ISO-ALPHA-ACIDS

CROSS REFERENCE TO RELATED APPLICATIONS

This application claims the priority of PCT/EP2011/067055, filed on Sep. 29, 2011, which claims priority to Great Britain Application No. 1016430.9, filed Sep. 30, 2010, the entire contents of each of which are hereby incorporated in total by reference.

FIELD OF THE INVENTION

The present invention relates to an improved process for the production of iso-alpha-acids (isohumulones) by the isomerisation of hop alpha-acids (humulones), such as in the form of a hop extract, using carbon-containing chemical compounds (or mixtures thereof) with one or more functional groups containing a (basic) nitrogen atom with a lone electron pair (a lone electron pair is a valence electron pair without bonding or sharing with other atoms). The present invention further relates to iso-alpha-acid compositions obtained by said improved isomerisation process and to the use of said iso-alpha-acid compositions in food and beverage application, particularly as bittering formulation, and/or as source to obtain reduced or hydrogenated iso-alpha-acid compositions.

BACKGROUND OF THE INVENTION

Traditionally, hops, in the form of hop cones or hop pellets, are added during the wort boiling stage of the brewing process. This results in the extraction of alpha-acids (humulones, such as humulone, adhumulone, cohumulone, posthumulone and prehumulone) into the sweet wort, which under the influence of temperature (thermal isomerisation) are partially isomerised to the corresponding iso-alpha-acids (isohumulones). These iso-alpha-acids are responsible for the characteristic bitter taste of hopped beer. Typical alpha-acid levels in the wort at the start of the wort boiling are below 0.01 wt % (below 100 ppm). Disadvantages of this traditional hopping approach to impart bitterness are the inefficient alpha-acid extraction and isomerisation at the wort pH, i.e. a pH between 5.2 and 5.4, typically resulting in iso-alpha-acid yields below 40% (GB 1,158,697).

It became clear that the hop utilization could be improved by performing the alpha-acid isomerisation outside the brewing process, and particularly under the effect of basic inorganic compounds. One patent uses powdered hops as process feed which are mixed with alkaline earth metal oxides and subsequently heated under anaerobic conditions (U.S. Pat. No. 4,123,561). Disadvantages of this process are off-flavour formation and low hop utilization. Therefore, the later developments used hop extracts, obtained by extraction of hop resins (among others the alpha-acids) from the hop cones, rather than powdered hops.

The use of hop extracts instead of the traditional hop products has multiple advantages, among which a more stable and more consistent chemical composition. Generally, such hop extracts are nowadays obtained via liquid or supercritical carbon dioxide extraction, which eliminates the problems of the presence of pesticide and solvent residues in the extracts experienced before when applying organic extraction solvents like hexane. Carbon dioxide hop extracts provide predominantly alpha-acids (humulones) next to beta-acids (lupulones), and they can be further fractionated to obtain alpha-acid enriched hop extracts.

Starting from these alpha-acid containing extracts, the "off-line" pre-isomerisation of alpha-acids outside the brewing (wort boiling) process can be achieved using alkali metal and/or alkaline earth metal based compounds via two approaches. The first approach applies a solvent-free reaction medium while in the other approach the transformation is performed after addition of solvents, either pure water or alternatively water mixed with an organic solvent.

The first approach is generally based on alkaline earth metal compounds, for example alkaline earth metal oxides (e.g. MgO). These inorganic accelerators are mixed with the alpha-acid containing extract. However, during these isomerisation processes, the oxides are at least partially dissolved and therefore, after a long reaction time at elevated temperature, the iso-alpha-acid products are obtained as alkaline earth metal cation-isohumulate complexes (U.S. Pat. No. 5,015,491) with an isomer distribution of cis- and trans-iso-alpha-acids of 50:50. To obtain the iso-alpha-acids as an organic phase, an additional step is required which involves acidification (with e.g. an aqueous solution of sulphuric acid) of the alkaline earth metal isohumulate salts. This leads to an iso-alpha-acid layer, which can be decanted from the separate aqueous layer containing the alkaline earth metal sulphate salts. To obtain the commercial product, a neutralisation process with a potassium compound is required which results in an aqueous solution of dissolved potassium isohumulates. This process type implies that the initially added alkaline earth metal compounds cannot be recovered as such from the products.

In the other approach, alkali metal salts and/or alkaline earth metal salts are used, e.g. $K_2CO_3$ and $MgCl_2$ solutions (U.S. Pat. Nos. 3,765,903; 3,952,061; 4,002,683; 4,758,445). Stoichiometric quantities of alkali metal cations and high temperatures are generally required to convert the alpha-acids into iso-alpha-acids in the water containing reaction medium. Again, to isolate the iso-alpha-acids, an acidification and a decantation step are required. In addition, the presence of water leads to the formation of unwanted degradation by-products, e.g. humulinic acids.

In U.S. Pat. No. 5,370,897, an alkaline earth metal salt (e.g. $MgSO_4$) and an alkali metal salt ($K_2CO_3$) were combined into one process to speed up the alpha-acid isomerisation.

U.S. Pat. No. 5,155,276 describes the application of a heterogeneous accelerator viz. $Al_2O_3$, additionally requiring a dissolved alkali metal salt in at least stoichiometric molar ratio to the alpha-acid reactant. Although in this process an 'insoluble catalyst' is used which can be separated from the reaction mixture by filtration after the isomerisation reaction, the heterogeneous accelerator is by itself not effective, and needs a second, dissolved accelerator. Moreover, additional acidification and decantation steps are required to obtain the iso-alpha-acid product.

The above clearly shows that the isomerisation processes of hop alpha-acids known in the art are complex operations, comprising the use of soluble reaction accelerating inorganic compounds and including acidification and decantation to remove the inorganic accelerators, thus resulting in high levels of waste products, with often the unwanted formation of degradation by-products. Thus, there remains a need for improved methods for the isomerisation of hop alpha-acids.

SUMMARY OF THE INVENTION

The present invention provides an improved process for the isomerisation of hop alpha-acids (or (partially) hydrogenated alpha-acids, particularly tetrahydro-alpha-acids) to iso-alpha-acids (or (partially) hydrogenated iso-alpha-acids, particularly tetrahydro-iso-alpha-acids) using carbon-containing chemical compounds having one or more functional groups containing a (basic) nitrogen atom with a lone electron pair. The present invention further relates to iso-alpha-acid compositions obtainable by said isomerisation of the present invention, and the use thereof.

A first object of the present invention provides a process for the isomerisation of hop alpha-acids to hop iso-alpha-acids comprising mixing a hop alpha-acid containing feed with at least one carbon-containing chemical compound with one or more functional groups containing a (basic) nitrogen atom with a lone electron pair and thus subjecting the hop alpha-acids to isomerisation. Preferably, said hop alpha-acid containing feed is a hop extract, more preferably being obtained by extraction with liquid or supercritical carbon dioxide.

Preferably, said carbon-containing chemical compound with one or more functional groups containing a (basic) nitrogen atom with a lone electron pair is selected from the group consisting of amino acids, ester compounds derived from an amino acid, amide compounds derived from an amino acid, salt compounds derived from an amino acid, amino phenols, amino alcohols, amino sugars, amines, imines, oximes, hydroxylamines, amidines, guanidines, amides, imides, ureas, pyrimidines, purines, and (functionalized) oligomeric or polymeric derivatives of these compounds; and these compounds are non-cyclic (aliphatic or unsaturated carbon side chains), cyclic (saturated or unsaturated rings), or heterocyclic (saturated or unsaturated rings) molecules. Preferably, zwitterionic carbon-containing chemical compounds with one or more functional groups containing a (basic) nitrogen atom with a lone electron pair have at least one functional group containing a (basic) nitrogen atom with a pKb value below 6, more preferably have at least one functional group containing a (basic) nitrogen atom with a pKb value below 5, most preferably at least one functional group containing a (basic) nitrogen atom with a pKb value below 4. Alternatively, non-zwitterionic carbon-containing chemical compounds with one or more functional groups containing a (basic) nitrogen atom with a lone electron pair comprise preferably at least one nitrogen atom that is bound to two or three carbon atoms, as for example in the case of secondary and tertiary amino groups. Said non-zwitterionic carbon-containing chemical compounds with one or more functional groups containing a (basic) nitrogen atom with a lone electron pair have preferably at least one functional group containing a (basic) nitrogen atom with a pKb value below 9, more preferably at least one functional group containing a (basic) nitrogen atom with a pKb value below 7, most preferably at least one functional group containing a (basic) nitrogen atom with a pKb value below 5.

In another preferred embodiment of the present invention, said carbon-containing chemical compound with one or more functional groups containing a (basic) nitrogen atom with a lone electron pair is a compound generally present in beer products and/or naturally occurring in the human body. More preferably said carbon-containing chemical compound with one or more functional groups containing a (basic) nitrogen atom with a lone electron pair is an alpha amino acid with D-stereoisomer configuration, an alpha amino acid with L-stereoisomer configuration, a beta amino acid, or a gamma amino acid. Most preferably, said carbon-containing chemical compound with one or more functional groups containing a (basic) nitrogen atom with a lone electron pair is L-proline or beta-alanine.

In another preferred embodiment of the present invention, the alpha-acid isomerisation reaction occurs under an oxygen-free atmosphere.

In another preferred embodiment of the present invention, the concentration of the alpha-acid compounds in the reaction medium i.e. after addition of the carbon-containing chemical compound with one or more functional groups containing a (basic) nitrogen atom with a lone electron pair to the alpha-acid containing feed, at the start of the isomerisation reaction is at least 1 weight %.

In yet another preferred embodiment of the present invention, the alpha-acid isomerisation reaction occurs in solvent-free or non-aqueous conditions. Alternatively, the alpha-acid isomerisation reaction according to the present invention, when the used carbon-containing chemical compound with one or more functional groups containing a (basic) nitrogen atom with a lone electron pair is not an amino acid, may be performed in a solvent or in a mixture of solvents. Alternatively, if an amino acid is used, in the alpha-acid isomerisation reaction according to the present invention, as the carbon-containing chemical compound with one or more functional groups containing a (basic) nitrogen atom with a lone electron pair, the mass ratio of said amino acid to water in the reaction medium is preferably at least 5:1. If the isomerisation reaction is performed in aqueous conditions, the pH of the reaction medium for the alpha-acid isomerisation is at least >5.5, preferably >6.5, more preferably >7.0, most preferably >7.5.

In another preferred embodiment of the present invention, the alpha-acid isomerisation reaction occurs at a temperature of at least 278 K, more preferably at a temperature between 323 and 383 K.

In yet another preferred embodiment of the present invention, the alpha-acid isomerisation reaction is performed at a molar ratio of alpha-acid to the nitrogen content of said chemical compound with one or more functional groups containing a (basic) nitrogen atom with a lone electron pair between 20:1 and 1:10 at the start of the isomerisation reaction.

Another preferred embodiment provides a method for the isomerisation of hop alpha-acids comprising mixing a hop alpha-acid containing feed with at least one carbon-containing chemical compound with one or more functional groups containing a (basic) nitrogen atom with a lone electron pair and further comprising a hydrogenation and/or reduction reaction step. Preferably, said hydrogenation and/or reduction reaction is carried out in the presence of hydrogen with heterogeneous metal based catalysts, preferably noble metal based catalysts, either in the absence or in the presence of a solvent, at a temperature of at least 278 K.

A second object of the present invention provides a hop iso-alpha-acid composition prepared or preparable from a hop extract comprising isomerised hop alpha-acids and at least one carbon-containing chemical compound having one or more functional groups containing a (basic) nitrogen atom with a lone electron pair. Preferably, the molar ratio of iso-alpha-acid to the nitrogen content of said carbon-containing chemical compound(s) with one or more functional groups containing a (basic) nitrogen atom with a lone electron pair of said hop iso-alpha-acid composition is between 20:1 and 1:10. More preferably, said hop iso-alpha-acid composition comprises iso-alpha-acid compounds and L-proline with a molar ratio of iso-alpha-acid to L-proline is between 3:1 and 1:3. Said iso-alpha-acid composition according to the present invention may comprise hop iso-alpha-acid compounds that are partially or fully reduced and/or hydrogenated.

A third object of the present invention relates to the use of a hop iso-alpha-acid composition according to the present invention in food, beverage or beer applications, particularly as bittering formulation for beer and beverage products. Also, said hop iso-alpha-acid composition according to the present invention can be used as feed for hydrogenation and/or reduction processes to yield partially or fully hydrogenated or reduced iso-alpha-acids.

DETAILED DESCRIPTION

Description

So that terms used throughout the description will have a clear and consistent meaning, the following definitions are provided:

A "lone electron pair" is a valence electron pair without bonding or sharing with other atoms.

An "amino acid" is a molecule containing an amino group, a carboxylic acid group and a (side) chain that varies between different amino acids. In an alpha amino acid, the amino group is attached to the carbon atom immediately adjacent to the carboxylic acid group (the alpha carbon). The various alpha amino acids differ in the kind of side chain attached to their alpha carbon, and can vary in size from just one hydrogen atom in glycine to a large heterocyclic group in tryptophan. Other types of amino acids exist when the amino group is attached to a different carbon atom; for example, in a beta amino acid (such as e.g. beta-alanine) the amino group is at the beta position from the carboxylic acid group, while in a gamma amino acid (such as e.g. gamma-amino-butyric acid) the carbon atom to which the amino group attaches is separated from the carboxylic acid group by two other carbon atoms.

In the context of the present invention, the term "alpha-acid" includes any alpha-acid compound naturally present in hop or a hop extract, such as humulone, adhumulone, cohumulone, posthumulone and prehumulone, as well as a hydrogenated and/or reduced derivative thereof, including a dihydro- and tetrahydro-alpha-acid compound, preferably a tetrahydro-alpha-acid. Likewise, in the context of the present invention, the term "iso-alpha-acid" includes any compound that is an isomerised hop alpha-acid compound, such as isohumulone, iso-adhumulone, iso-cohumulone, iso-posthumulone and iso-prehumulone, as well as a hydrogenated and/or reduced derivative thereof, including a dihydro-iso-alpha-acid, a tetrahydro-iso-alpha-acid and a hexahydro-iso-alpha-acid compound.

The present invention provides an improved process for the isomerisation of hop alpha-acids (or (partially) hydrogenated alpha-acids, particularly tetrahydro-alpha-acids) to iso-alpha-acids (or (partially) hydrogenated iso-alpha-acids, particularly tetrahydro-iso-alpha-acids) using carbon-containing chemical compounds having one or more functional groups containing a (basic) nitrogen atom with a lone electron pair. Without being bound by theory, the isomerisation of hop alpha-acids to iso-alpha-acids is catalyzed upon addition of these carbon-containing chemical compounds with one or more functional groups containing a (basic) nitrogen atom with a lone electron pair (or a mixture thereof) to the hop alpha-acid containing feed. The present invention further relates to iso-alpha-acid compositions obtainable by said alpha-acid isomerisation of the present invention, and the use thereof.

Thus, a first object of the present invention relates to a method for the isomerisation of hop alpha-acids (or (partially) hydrogenated alpha-acids) comprising contacting or mixing an alpha-acid containing feed, preferably a hop extract, and a carbon-containing chemical compound with one or more functional groups containing a (basic) nitrogen atom with a lone pair (or mixtures of such compounds), either in the absence or in the presence of a solvent, preferably at a reaction temperature of at least 278 K, and preferably in the absence of oxygen.

Alpha-acid Containing Feed

In the context of the present invention, the alpha-acid containing feed is preferably a hop extract, said hop extract preferably obtained by liquid or supercritical carbon dioxide extraction. The alpha-acid containing feed can be a feed of pure hop alpha-acids, or a hop extract enriched in hop alpha-acids, or a mixture of hop alpha-acids and hop beta-acids, or a mixture of hop alpha-acids, hop beta-acids and hop oils, or a mixture of hop alpha-acids, hop beta-acids, hop oils and hop hard resins, or a hop extract, or a carbon dioxide hop extract. The alpha-acid containing feed can also be hop pellets or powdered hops.

In a process according to the invention, use may be made of an alpha-acid containing feed that (naturally) contains a carbon-containing chemical compound with one or more functional groups containing a (basic) nitrogen atom with a lone electron pair, as may be the case if powdered hops or hop pellets are used as the alpha-acid containing feed. In a carbon dioxide hop extract on the other hand, the content of for example the naturally occurring alpha amino acids with L-stereoisomer configuration is very low as amino acids (and also oligopeptides and polypeptides) are almost insoluble in dense carbon dioxide and are thus not extracted during the hop acid extraction process. However, typically said carbon-containing chemical compound with one or more functional groups containing a (basic) nitrogen atom with a lone electron pair is added to the hop alpha-acid containing feed, in addition to one or more of said carbon-containing chemical compounds with one or more functional groups containing a (basic) nitrogen atom with a lone electron pair that may already naturally be present.

Carbon-containing Chemical Compound with One or more Functional Groups Containing a (Basic) Nitrogen Atom with a Lone Electron Pair In the context of the present invention, a suitable carbon-containing chemical compound with one or more functional groups containing a (basic) nitrogen atom with a lone electron pair can be, but is not limited to an amino acid, amino phenol, amino alcohol, amino sugar, amine, imine, oxime, amide, imide, urea, hydroxylamine, amidine, guanidine, purine, pyrimidine, or a (functionalized) derivative thereof, or can also be an oligomeric or polymeric compound (e.g an oligopeptide or polypeptide/protein) containing at least one (basic) nitrogen atom with a lone electron pair. Said compound can structurally be a non-cyclic (aliphatic or unsaturated carbon side chains), cyclic (saturated or unsaturated rings), or heterocyclic (saturated or unsaturated rings) molecule.

In a preferred embodiment said carbon-containing chemical compound with at least one functional group containing a (basic) nitrogen atom with a lone electron pair can exist as a zwitterion (such as amino acids e.g. alpha amino acids with L-stereoisomer configuration or beta amino acids like beta-alanine). Said zwitterionic carbon-containing chemical compound with at least one functional group containing a (basic) nitrogen atom with a lone electron pair thus comprises, apart from other functional groups, at least the combination of an acidic centre (such as a carboxylic acid group) and a basic centre (amino group).

A preferred zwitterionic carbon-containing chemical compound with at least one functional group containing a (basic) nitrogen atom with a lone electron pair is an amino acid with only one (basic) nitrogen atom with a lone electron pair (e.g. glycine, L-proline and beta-alanine), more preferably is an alpha amino acid, most preferably the L-stereoisomer thereof, with a non-polar side chain (for example L-proline) or with a polar, uncharged side chain (for example L-threonine).

Another preferred zwitterionic carbon-containing chemical compound according to the present invention is an amino acid, more preferably an alpha amino acid, most preferably the L-stereoisomer thereof, with at least two (basic) nitrogen atoms with a lone electron pair (for example L-tryptophan).

Said zwitterionic carbon-containing chemical compounds with one or more functional groups containing a (basic) nitrogen atom with a lone electron pair have preferably at least one functional group containing a (basic) nitrogen atom with a pKb value below 6 (for example L-asparagine), more preferably at least one functional group containing a (basic) nitrogen atom with a pKb value below 5 (for example L-alanine), most preferably at least one functional group containing a (basic) nitrogen atom with a pKb value below 4 (for example L-proline). The pKb values are defined as dissociation constants in an aqueous solution under standard conditions; such information can for example be found in the CRC Handbook of Chemistry and Physics and other reference works.

In another preferred embodiment, said carbon-containing chemical compound with at least one functional group containing a (basic) nitrogen atom with a lone electron pair cannot exist as a zwitterion. Preferably, said non-zwitterionic carbon-containing chemical compounds with one or more functional groups containing a (basic) nitrogen atom with a lone electron pair of comprise at least one nitrogen atom that is bound to two or three carbon atoms, as for example in the case of secondary and tertiary amino groups. Without being bound by theory, the reactivity of the amino group in such compounds comprising a secondary and/or a tertiary amino group is balanced by the steric hindrance of the carbon containing chains linked to said amino group. Said non-zwitterionic carbon-containing chemical compounds with one or more functional groups containing a (basic) nitrogen atom with a lone electron pair have preferably at least one functional group containing a (basic) nitrogen atom with a pKb value below 9 (for example pyridine), more preferably at least one functional group containing a (basic) nitrogen atom with a pKb value below 7 (for example purine), most preferably at least one functional group containing a (basic) nitrogen atom with a pKb value below 5 (for example piperidine).

In a preferred embodiment of the present invention, said carbon-containing chemical compound with one or more functional groups containing a (basic) nitrogen atom with a lone electron pair is a safe compound that has GRAS status, and/or is a compound that is naturally occurring in the human body or that is generally present in beverages, particularly beer products. Such preferred carbon-containing chemical compounds with one or more functional groups containing a (basic) nitrogen atom with a lone electron pair include among others the naturally occurring amino acids, for example (alpha) amino acids such as glycine, L-proline, beta-alanine, gamma-amino-butyric acid, ornithine, etc., More preferably, said carbon-containing chemical compound with one or more functional groups containing a (basic) nitrogen atom with a lone electron pair is an alpha amino acid, most preferably with the L-stereoisomer configuration, more in particular selected from the group consisting of L-alanine, L-valine, L-leucine, L-isoleucine, L-phenylalanine, L-tryptophan, L-methionine, L-proline, L-aspartic acid, L-glutamic acid, L-glutamine, L-serine, L-threonine, L-cysteine, L-tyrosine, L-asparagine, L-histidine, L-lysine, L-arginine and L-selenocysteine. Most preferably, said carbon-containing chemical compound with one or more functional groups containing a (basic) nitrogen atom with a lone electron pair is L-proline.

Advantageously, as these naturally occurring compounds, particularly the alpha amino acid compounds with L-stereoisomer configuration, are present in beer and beverages, said compounds do not have to be separated from the obtained iso-alpha-acid product phase after the isomerisation process as these naturally occurring compounds, in particular the L-amino acids, are thus beer-compatible.

Consequently, the iso-alpha-acid product, obtained by performing the method according to the present invention wherein one or more naturally occurring compounds (such as the naturally occurring (alpha) amino acids, for example L-amino acids (e.g. L-proline)) are used as the carbon-containing chemical compound(s) with a functional group containing a (basic) nitrogen atom with a lone electron pair for the alpha-acid isomerisation reaction, can be applied as such, or alternatively diluted in a food- or beer-compatible solvent (e.g. water and/or ethanol), in food and beverages applications, particularly for beers, particularly as a bittering formulation, without requiring additional purification prior to use. Alternatively, the iso-alpha-acid products can be (partially) separated from the carbon-containing chemical compound(s) with one or more functional groups containing a (basic) nitrogen atom with a lone electron pair by means of separation techniques such as washing, extraction, etc.

In another preferred embodiment of the present invention, said carbon-containing chemical compound with one or more functional groups containing a (basic) nitrogen atom with a lone electron pair is an amino acid of the alpha-amino-acid-type with a D-stereoisomer configuration, more preferably selected from the group consisting of D-alanine, D-valine, D-leucine, D-isoleucine, D-phenylalanine, D-tryptophan, D-methionine, D-proline, D-aspartic acid, D-glutamic acid, D-glutamine, D-serine, D-threonine, D-cysteine, D-tyrosine, D-asparagine, D-histidine D-lysine, D-arginine and D-selenocysteine.

In yet another preferred embodiment of the present invention, said carbon-containing chemical compound with one or more functional groups containing a (basic) nitrogen atom with a lone electron pair is an amino acid with the amino group not in alpha position of the carboxylic acid group, including but not limited to an amino acid of the beta-amino-acid-type like beta-alanine, niacin (vitamin B3), etc., or an amino acid of the gamma-amino-acid type like gamma-amino-butyric acid.

In another preferred embodiment of the present invention said carbon-containing chemical compound with one or more functional groups containing a (basic) nitrogen atom with a lone electron pair is an ester compound derived from an amino acid, e.g. an ester compound formed by reaction of L- or D-amino acids with ethanol (for example L-proline ethyl ester), or formed by reaction of beta-alanine with ethanol, etc.

In another preferred embodiment of the present invention said carbon-containing chemical compound with one or more functional groups containing a (basic) nitrogen atom with a lone electron pair is an amide compound derived from an amino acid, e.g. the amide compounds formed by reaction of L- or D-amino acids with amine compounds (for example L-prolinamide), etc.

In another preferred embodiment of the present invention said carbon-containing chemical compound with one or more functional groups containing a (basic) nitrogen atom with a lone electron pair is a salt compound derived from amino acids, for example monosodium glutamate, monopotassium glutamate, etc.

In another preferred embodiment of the present invention said carbon-containing chemical compound with one or more functional groups containing a (basic) nitrogen atom with a lone electron pair is an amino alcohol (i.e. a carbon-containing chemical compound with at least one or more functional groups containing a (basic) nitrogen atom with a lone electron pair and at least one alcohol group, apart from other functional groups), for example L-prolinol, sphingosine and its derivatives (sphingolipids), tris(hydroxymethyl)aminomethane, triethanolamine, etc.

In another preferred embodiment of the present invention said carbon-containing chemical compound with one or more functional groups containing a (basic) nitrogen atom with a lone electron pair is an amino sugar or its derivatives, for example meglumine, glucosamine (and polymeric derivatives thereof such as chitosan), riboflavin (vitamin B2) and nucleosides.

In another preferred embodiment of the present invention said carbon-containing chemical compound with one or more functional groups containing a (basic) nitrogen atom with a lone electron pair is a nitrogen-containing oligomer or polymer, for example oligopeptides, polypeptides, glycoproteins, melanoidins, polyvinylpyrrolidone, polyethyleneimine, etc.

In another preferred embodiment of the present invention said carbon-containing chemical compound with one or more functional groups containing a (basic) nitrogen atom with a lone electron pair is selected from amines, hydroxylamines, ureas, purines, pyrimidines, azoles, imines, oximes, amides, imides, amidines, guanidines. These compounds can be non-cyclic (aliphatic or unsaturated carbon side chains), or cyclic (saturated or unsaturated rings) or heterocyclic (saturated or unsaturated rings). Examples are pyridine, piperidine, pyrrolidine, pyrazine, piperazine, pyrimidine(s), (imid)azole(s), purine(s), picolines, lutidines, etc. and their derivatives.

In another preferred embodiment of the present invention, the alpha-acid isomerisation reaction is catalyzed upon addition of mixtures of the above described carbon-containing chemical compound(s) with one or more functional groups containing a (basic) nitrogen atom with a lone electron pair.

It is understood that this list is not limitative and all carbon-containing chemical compounds having one or more functional groups containing a (basic) nitrogen atom with a lone electron pair can be used within the present invention. Particularly, any combination or mixture of the above described carbon-containing chemical compounds having one or more functional groups containing a (basic) nitrogen atom with a lone electron pair can be used.

Alpha-acid Isomerisation Reaction Conditions

Preferably, a hop alpha-acid isomerisation process according to the present invention is performed at oxygen levels in the atmosphere above the reaction mixture lower than 5%, 4%, 3%, 2% or 1%. More preferably, during a hop alpha-acid isomerisation process according to the present invention an oxygen-free or inert atmosphere is maintained above the reaction mixture. Suitable inert or oxygen-free atmospheres can be created by using gases like nitrogen, helium, argon or carbon dioxide, or by working under vacuum.

The isomerisation reaction according to the present invention can be performed in solvent-free conditions, or in the presence of a solvent or mixture of solvents.

In a preferred embodiment of the method according to the present invention, the isomerisation of alpha-acids using said above described carbon-containing chemical compound with one or more functional groups containing a (basic) nitrogen atom with a lone electron pair is performed in solvent-free conditions, such as in the case when mixing said above described carbon-containing chemical compound with a hop extract obtained by liquid or supercritical carbon dioxide extraction, or in non-aqueous conditions when performed in the presence of a solvent or a mixture of solvents.

Alternatively, the isomerisation of alpha-acids according to the present invention can be performed in the presence of a protic solvent (for example with hydroxyl groups), including $H_2O$, EtOH, etc. or mixtures thereof. If the isomerisation reaction is performed in aqueous conditions, the pH of the reaction medium for the alpha-acid isomerisation is at least >5.5, preferably >6.5, more preferably >7.0, most preferably >7.5. It is thus understood that a method for isomerisation of hop alpha-acids according to the present invention typically takes place under conditions different from the wort boiling stage of the brewing process, with a typical pH of about 5.2.

The alpha-acid isomerisation according to the present invention using a carbon-containing chemical compound with one or more functional groups containing a (basic) nitrogen atom with a lone pair is preferably performed in reaction mixtures, which can be solvent-free or can comprise one or more solvents, with an alpha-acid content of at least 0.5 weight %, 1 weight % or 2 weight % at the start of the isomerisation reaction. At lower alpha-acid contents, as for example in the wort boiling stage of the brewing process with typically an alpha-acid content below 0.01 weight %, the yield of iso-alpha-acids in the alpha-acid isomerisation by means of a carbon-containing chemical compound with one or more functional groups containing a (basic) nitrogen atom was the same as in the control experiment performed in the absence of a carbon-containing chemical compound with one or more functional groups containing a (basic) nitrogen atom. This was experimentally verified using pyridine, reported to be present in beers, as the carbon-containing chemical compound with one or more functional groups containing a (basic) nitrogen atom, in equimolar ratio to the alpha-acids at the start of the isomerisation reaction, under standard alpha-acid isomerisation conditions apart from the dilution in $H_2O$ (pH≈5), as described in Example 6.

The alpha-acid isomerisation according to the present invention using a zwitterionic carbon-containing chemical compound with one or more functional groups containing a (basic) nitrogen atom with a lone pair (such as L-proline, beta-alanine, etc.) is preferably performed in the absence of $H_2O$ in the reaction mixture or with a low content of $H_2O$ in the reaction mixture. More preferably, the mass ratio of the zwitterionic carbon-containing chemical compound with one or more functional groups containing a (basic) nitrogen atom with a lone pair to $H_2O$ in the reaction mixture is at least 3:1, 5:1, 7:1 or 10:1. In the case of a high $H_2O$ level in the reaction mixture versus the level of zwitterionic carbon-containing chemical compounds with one or more functional groups containing a (basic) nitrogen atom with a lone pair, as e.g. in the wort boiling stage of the brewing process, the observed iso-alpha-acid yield was the same as in a control experiment in the absence of a zwitterionic carbon-containing chemical compound with one or more functional groups containing a (basic) nitrogen atom with a lone pair (see also Example 6).

Preferably, the alpha-acid isomerisation reaction according to the present invention is allowed to proceed for a time sufficient to achieve more than 50%, 60%, 70% or 80% conversion of the alpha-acid reactants, more preferably at least 90% conversion of the alpha-acid reactants, with preferably more than 90% selectivity to iso-alpha-acid products. As understood by a person of ordinary skill in the art, the reaction time to obtain at least a 50%, 60%, 70%, 80% or 90% yield of iso-alpha-acids is, given a specific alpha-acid containing feed (with a specific composition and alpha-acid content), inter alia dependent on the used carbon-containing chemical compound(s) with one or more functional groups containing a (basic) nitrogen atom with a lone electron pair, on the applied substrate to said carbon-containing chemical compound(s) with one or more functional groups containing a (basic) nitrogen atom with a lone electron pair ratio, and on the applied process conditions such as the reaction temperature and the presence or absence of solvents or solvent mixtures.

In another preferred embodiment of the method of the present invention, the alpha-acid isomerisation is performed with the molar ratio of the alpha-acid to the nitrogen content of the carbon-containing chemical compound(s) with one or more functional groups containing a (basic) nitrogen atom with a lone electron pair between 20:1 and 1:10, preferably between 10:1 and 1:5 or between 5:1 and 1:5, more preferably between 3:1 and 1:3 or between 2:1 and 1:2 at the start of the isomerisation reaction.

The isomerisation of hop alpha-acids to iso-alpha-acids according to the present invention is performed at reaction temperatures of at least 278 K. Preferably, the alpha-acid isomerisation is performed at a reaction temperature in the range of 293 K to 388 K, more preferably in the range of 323 K to 383 K, most preferably in the range of 353 K to 378 K.

The hop alpha-acid isomerisation according to the present invention is preferably performed with reaction times in the range of 0.1 to 48 hours, more preferably in the range of 0.5 to 24 hours, most preferably in the range of 1 to 12 hours.

After obtaining sufficient/the intended conversion of the alpha-acid reactant (for example in the case of the alpha-acid isomerisation in solvent-free conditions), the concentration of the carbon-containing chemical compounds with one or more functional groups containing a (basic) nitrogen atom with a lone electron pair in the iso-alpha-acid containing product phase can be lowered, or the iso-alpha-acid products can be separated, via separation techniques such as extraction, washing or more advanced separation techniques known in the art.

In another preferred embodiment of the method of the present invention the beer-compatible carbon-containing chemical compound(s) with one or more functional groups containing a (basic) nitrogen atom with a lone electron pair, in particular those that are generally present in beer products and/or naturally occurring in the human body, such as amino acids, particularly beta-alanine or alpha-amino acids with an L-stereoisomer configuration, like L-proline, are not removed from the iso-alpha-acid product phase after the isomerisation reaction.

It is understood that the isomerisation reaction according to the present invention can be followed or preceded by a hydrogenation and/or reduction reaction, or performed substantially simultaneously with a hydrogenation and/or reduction reaction, to form dihydro-, tetrahydro- and/or hexahydro-iso-alpha-acids.

Thus, the present invention also relates to a method for the preparation of derived (hydrogenated and/or reduced) iso-alpha-acid products from hop alpha-acids comprising the step of mixing a hop alpha-acid containing feed and a carbon-containing chemical compound with one or more functional groups containing a (basic) nitrogen atom with a lone electron pair acting (or a mixture of said compounds), either in the absence or in the presence of a solvent and preferably in the absence of oxygen, and, optionally, further comprising the step of a hydrogenation and/or reduction reaction by performing a hydrogenation and/or reduction reaction of the alpha-acids and/or iso-alpha-acids.

Said hydrogenation and/or reduction reactions can be any process which results in the formation of dihydro-, tetrahydro-, and/or hexahydro-iso-alpha-acids. Many hydrogenation and/or reduction processes are well known in the art. For instance, all reduction processes known in the art for the production of dihydro-iso-alpha-acids (or hexahydro-iso-alpha-acids via a tetrahydro-iso-alpha-acid intermediate) use a borohydride mediated reduction of iso-alpha-acids or derivatives thereof (U.S. Pat. Nos. 3,558,326; 4,324,810). The hydrogenation processes to produce tetrahydro-iso-alpha-acids (or hexahydro-iso-alpha-acids via a dihydro-iso-alpha-acid intermediate) are carried out in the presence of $H_2$ with heterogeneous noble metal catalysts, generally based on Pd (U.S. Pat. Nos. 5,013,571; 5,600,012). In a preferred embodiment said hydrogenation processes are carried out in the presence of $H_2$ with metal based catalysts, such as based on (noble) metals. These hydrogenation processes are carried out in the presence of $H_2$ with catalysts based on for example Ag, Au, Co, Cu, Ir, Ni, Pd, Pt, Rh, Ru, etc.

In a preferred embodiment, the combination of the alpha-acid isomerisation with a hydrogenation reaction results in the formation of hexahydro-iso-alpha-acids, but does not require an additional reduction reaction, such as an alkali metal borohydride reduction. Thus, the present invention also relates to a method for the derivatization of alpha-acids comprising the steps of (i) mixing an alpha-acid containing feed, preferably a hop extract, and a carbon-containing chemical compound with one or more functional groups containing a (basic) nitrogen atom with a lone electron pair (or mixtures of such compounds), either in the absence or in the presence of a solvent and preferably in the absence of oxygen, and (ii) contacting the obtained iso-alpha-acid and a heterogeneous ruthenium containing catalyst, either in the absence or in the presence of a solvent, and holding this mixture under a hydrogen containing atmosphere (either pure hydrogen gas or hydrogen diluted with another gas, such as an inert gas such as nitrogen, helium, argon, or carbon dioxide or a mixture thereof) at a temperature of at least 278 K.

Advantageously, as a result of the isomerisation reaction of the present invention, iso-alpha-acids are obtained that are rich in cis-iso-alpha-acids, which are more chemically stable than trans-iso-alpha-acids. The invention allows to obtain iso-alpha-acids with a cis:trans ratio that is preferably is equal to or higher than 65:35, more preferably that is equal to or higher than 70:30, and most preferably that is equal to or higher than 75:25.

The present invention thus relates to a method for the production of an iso-alpha-acid composition, with a cis:trans ratio of preferably at least 65:35, more preferably at least 70:30 or most preferably at least 75:25, comprising the steps of (i) mixing an alpha-acid containing feed and a carbon-containing chemical compound with one or more functional groups containing a (basic) nitrogen atom with a lone electron pair (or a mixture of said compounds), either in the absence or in the presence of a suitable solvent and preferably in the absence of oxygen, and (ii) subjecting said reaction mixture to a temperature of at least 278 K.

Advantageously, the alpha-acid isomerisation reaction according to the present invention can be carried out without, and does not require, the addition of inorganic compounds as isomerisation accelerators, like soluble alkali metal or alkaline earth metal compounds, such as those used in the isomerisation reactions known in the art. Specifically, there is no need to use additional sodium hydroxide, potassium hydroxide, magnesium hydroxide, calcium hydroxide, magnesium oxide, calcium oxide, sodium carbonate, potassium carbonate, magnesium carbonate, calcium carbonate, sodium bicarbonate, potassium bicarbonate, magnesium bicarbonate or calcium bicarbonate. Again, it is understood that this list is not limitative.

The alpha-acid isomerisation process according to the present invention can be conducted in a batch reactor whereby the carbon-containing chemical compound with one or more functional groups containing a (basic) nitrogen atom with a lone electron pair (or a combination of such compounds) and an alpha-acid containing feed are loaded into the reaction vessel at the start of the process. It is also possible to use other reactor procedures and designs (for example also for continuous mode processes) that are generally known to people skilled in chemical processes.

Iso-alpha-acid Composition

A second object of the present invention provides an iso-alpha-acid composition obtainable by the methods according to the present invention, wherein said iso-alpha-acid composition comprises iso-alpha-acid compounds with a cis:trans ratio of preferably at least 65:35, more preferably of at least 70:30 or most preferably at least 75:25.

In a preferred embodiment said iso-alpha-acid composition, preferably prepared from a hop extract, comprises one or more iso-alpha-acid compounds (hydrogenated or not and/or reduced or not) and one or more carbon-containing chemical compounds with one or more functional groups containing a (basic) nitrogen atom with a lone electron pair. Preferably, said iso-alpha-acid composition is a liquid iso-alpha-acid composition. Said carbon-containing chemical compound with one or more functional groups containing a (basic) nitrogen atom with a lone electron pair can be any of the above described carbon-containing chemical compounds with one or more functional groups containing a (basic) nitrogen atom with a lone electron pair, but preferably said carbon-containing compound is a safe compound with GRAS status, and/or is a compound that is naturally occurring in the human body or that is generally present in beverages, particularly beer products, such as the naturally occurring amino acids, in particular the alpha amino acids with L-stereoisomer configuration.

Preferably, in said iso-alpha-acid composition the molar ratio of the iso-alpha-acid to the nitrogen content of an amino acid or another carbon-containing chemical compound with one or more functional groups containing a (basic) nitrogen atom with a lone electron pair, is between 20:1 and 1:10, preferably between 10:1 and 1:5 or between 5:1 and 1:5, more preferably between 3:1 and 1:3 or between 2:1 and 1:2. In a more preferred embodiment said iso-alpha-acid composition comprises one or more iso-alpha-acid compounds (hydrogenated or not and/or reduced or not) and an amino acid with a molar ratio of iso-alpha-acid to said amino acid between 3:1 and 1:3, most preferably between 2:1 and 1:2. Preferably, said amino acid is L-proline or beta-alanine.

The iso-alpha-acid composition according to the present invention can be used as process feed for hydrogenation and/or reduction processes to yield hydrogenated or reduced iso-alpha-acids, such as dihydro-iso-alpha-acids, tetrahydro-iso-alpha-acids, hexahydro-iso-alpha-acids, etc. Alternatively, the iso-alpha-acid products can be separated from the iso-alpha-acid composition according to the present invention by means of separation techniques such as washing, extraction or more advanced procedures, etc., and consequently used as feed for hydrogenation and/or reduction processes to yield hydrogenated or reduced iso-alpha-acid compounds.

In a preferred embodiment, said carbon-containing chemical compound with one or more functional groups containing a (basic) nitrogen atom with a lone electron pair according to the present invention is not separated from said iso-alpha-acid composition before the hydrogenation and/or reduction reaction.

Thus, the present invention also relates to an iso-alpha-acid composition obtainable by the methods according to the present invention, wherein said iso-alpha-acid composition comprises iso-alpha acid compounds with a cis:trans ratio (of the iso-alpha-acid isomers and/or hydrogenated or reduced iso-alpha-acid compounds) of preferably at least 65:35, more preferably at least 70:30. In a preferred embodiment said iso-alpha-acid composition comprises iso-alpha-acid compounds and/or hydrogenated or reduced iso-alpha-acid compounds, such as dihydro-iso-alpha-acids, tetrahydro-iso-alpha-acids and/or hexahydro-iso-alpha-acids.

In a preferred embodiment said iso-alpha-acid composition comprises one or more iso-alpha-acid compounds (hydrogenated or not and/or reduced or not) and one or more carbon-containing chemical compounds with one or more functional groups containing a (basic) nitrogen atom with a lone electron pair. Said carbon-containing chemical compound with one or more functional groups containing a (basic) nitrogen atom with a lone electron pair can be any of the above-described carbon-containing chemical compounds with one or more functional groups containing a (basic) nitrogen atom with a lone electron pair. In a more preferred embodiment said iso-alpha-acid composition comprises one or more iso-alpha-acid compounds derived from hop products (hydrogenated or not and/or reduced or not) and one or more carbon-containing chemical compounds with one or more functional groups containing a (basic) nitrogen atom with a lone electron pair that are naturally occurring in the human body and/or generally present in beer products, such as the naturally occurring amino acids, particularly the alpha amino-acids with L-stereoisomer configuration, like L-proline.

Alternatively, the iso-alpha-acid products (hydrogenated or not and/or reduced or not) can be separated from the iso-alpha-acid composition according to the present invention by means of separation techniques such as washing, extraction or more advanced procedures, etc.

Said iso-alpha-acid composition (comprising one or more iso-alpha-acid compounds (hydrogenated or not and/or reduced or not)) according to the present invention can be used as such, or diluted in a food-compatible or beverage-compatible solvent, preferably a beer-compatible solvent, as bittering formulation for beers. In a preferred embodiment, the carbon-containing chemical compound (or mixture thereof) with one or more functional groups containing a (basic) nitrogen atom with a lone electron pair according to the present invention is not separated from the iso-alpha-acid compounds (hydrogenated or not and/or reduced or not).

The details of the invention will be explained below with reference to the Examples:

EXAMPLE 1

Solvent-free Isomerisation of Alpha-acids (Alpha-acid Feed Containing Alpha-acids and Iso-alpha-acids) with Carbon-containing Chemical Compounds with One or more Functional Groups Containing a (Basic) Nitrogen Atom with a Lone Pair at 363 K All solvent-free isomerisation experiments were performed in triplicate for statistical reliability. The starting composition of the alpha-acid feed was: 94.1% alpha-acids and 5.9% iso-alpha-acids. Varying amounts of the carbon-containing chemical compounds with one or more functional groups containing a (basic) nitrogen atom with a lone pair were added to 0.36 g of alpha-acid feed ($\approx 10^{-3}$ mol alpha-acid reactant). Next, the reaction mixture was stirred and heated to 363 K for 6 h. All reaction vessels were pressurized with 0.2 MPa nitrogen gas.

The sample analyses were performed by means of an HPLC device equipped with a binary pump, vacuum degasser, autosampler, column thermostat, and diode array detector. Two Zorbax Extend C18 columns (150 mm length×4.6 mm inner diameter, packed with 5 µm particles) were used in series. The mobile phase consisted of 5 mM ammonium acetate in 20% (v/v) ethanol adjusted to a pH of 9.95 with ammonia (A solvent) and a mixture consisting of 60% acetonitrile (60%) and 40% ethanol (v/v) (B solvent). The flow rate was set at 0.4 mL/min and solvent gradient elution was performed: 0-12 min: 0-16% B, 12-14 min: 16-25% B, 14-44 min: 25-40% B, 44-54 min: 40-60% B, 54-64 min: 60-90% B, 64-70 min: 90-100% B. The column temperature was maintained at 308 K. 100 µL volumes of filtered samples were injected. The UV detection was performed at 256 nm for the iso-alpha-acid products and 330 nm for the alpha-acid substrates. The samples from the solvent-free isomerisation experiments were analyzed after addition of 1 mL ethanol.

TABLE 1

Solvent-free isomerisation of alpha-acids (alpha-acid feed containing alpha-acids and iso-alpha-acids) with carbon-containing chemical compounds with one or more functional groups containing a (basic) nitrogen atom with a lone pair at 363 K

| | Carbon-containing chemical compound with one or more functional groups containing a (basic) nitrogen | Weight of carbon-containing chemical compound with one or more functional groups containing a (basic) nitrogen | Yield of iso-alpha-acids |
|---|---|---|---|
| entry 1 | pyridine | 0.079 g | 13.4% |
| entry 2 | 2-methyl-pyridine | 0.093 g | 14.2% |
| entry 3 | 2,6-dimethyl-pyridine | 0.107 g | 13.9% |
| entry 4 | piperidine | 0.085 g | 18.1% |
| entry 5 | pyrrole | 0.067 g | 10.5% |
| entry 6 | pyrrolidine | 0.071 g | 24.6% |
| entry 7 | purine | 0.120 g | 9.9% |
| entry 8 | / | / | 7.6% |

Reaction conditions: molar reactant:(carbon-containing chemical compound with one or more functional groups containing a (basic) nitrogen atom with a lone pair) ratio = 1; 0.36 g reactant; 363 K; 6 h.

At a reaction temperature of 363 K, 0.36 g of alpha-acids was converted with 0.079 g of pyridine (molar reactant:pyridine ratio=1) to iso-alpha-acids with an iso-alpha-acid yield of 13.4% after 6 h (Table 1, entry 1). In the control experiment without addition of a carbon-containing chemical compound with one or more functional groups containing a (basic) nitrogen atom with a lone pair, an iso-alpha-acid yield of 7.6% was obtained under the same reaction conditions (Table 1, entry 8). Under the same reaction conditions, 0.093 g of 2-methyl-pyridine (molar reactant:2-methyl-pyridine ratio=1) resulted in an iso-alpha-acid yield of 14.2% (Table 1, entry 2). Under the same reaction conditions, 0.107 g of 2,6-dimethyl-pyridine (molar reactant:2,6-dimethyl-pyridine ratio ≈1) resulted in an iso-alpha-acid yield of 13.9% (Table 1, entry 3). Under the same reaction conditions, 0.085 g of piperidine (molar reactant:piperidine ratio=1) resulted in an iso-alpha-acid yield of 18.1% (Table 1, entry 4). Under the same reaction conditions, 0.067 g of pyrrole (molar reactant:pyrrole ratio=1) resulted in an iso-alpha-acid yield of 10.5% (Table 1, entry 5). Under the same reaction conditions, 0.071 g of pyrrolidine (molar reactant:pyrrolidine ratio=1) resulted in an iso-alpha-acid yield of 24.6% (Table 1, entry 6). Under the same reaction conditions, 0.120 g of purine (molar reactant:purine ratio=1) resulted in an iso-alpha-acid yield of 9.9% (Table 1, entry 7).

EXAMPLE 2

Solvent-free Isomerisation of Alpha-acids (Alpha-acid Feed: Hop Extract Enriched in Alpha-acids) with Carbon-containing Chemical Compounds with One or more Functional Groups Containing a (Basic) Nitrogen Atom with a Lone Pair at 363 K All solvent-free isomerisation experiments were performed in triplicate for statistical reliability. The starting composition of the alpha-acid feed was: 79.7% alpha-acids, 1.9% iso-alpha-acids and 1.5% beta-acids. Varying amounts of the carbon-containing chemical compounds with one or more functional groups containing a (basic) nitrogen atom with a lone pair were added to 0.45 g of alpha-acid feed ($\approx 0.36$ g alpha-acid reactant, or $\approx 10^{-3}$ mol alpha-acid reactant). Next, the reaction mixture was stirred and heated to 363 K for 6 h. All reaction vessels were pressurized with 0.2 MPa nitrogen gas.

The sample analyses were performed as described in Example 1.

At a reaction temperature of 363 K, 0.36 g of alpha-acids was converted with 0.079 g of pyridine (molar reactant:pyridine ratio=1) to iso-alpha-acids with an iso-alpha-acid yield of 19.2% after 6 h (Table 2, entry 1). In the control experiment without addition of a carbon-containing chemical compound with one or more functional groups containing a (basic) nitrogen atom with a lone pair, an iso-alpha-acid yield of 4.2% was obtained under the same reaction conditions (Table 2, entry 6). Under the same reaction conditions, 0.085 g of piperidine (molar reactant:piperidine ratio=1) resulted in an iso-alpha-acid yield of 24.7% (Table 2, entry 2). Under the same reaction conditions, 0.071 g of pyrrolidine (molar reactant:pyrrolidine=1) resulted in an iso-alpha-acid yield of 28.9% (Table 2, entry 3). Under the same reaction conditions, 0.157 g of dipentylamine (molar reactant:dipentylamine ratio=1) resulted in an iso-alpha-acid yield of 25.3% (Table 2, entry 4). Under the same reaction conditions, 0.143 g of tripropylamine (molar reactant:tripropylamine ratio=1) resulted in an iso-alpha-acid yield of 26.1% (Table 2, entry 5).

TABLE 2

Solvent-free isomerisation of alpha-acids (alpha-acid feed: hop extract enriched in alpha-acids) with carbon-containing chemical compounds with one or more functional groups containing a (basic) nitrogen atom with a lone pair at 363 K

|  | Carbon-containing chemical compound with one or more functional groups containing a (basic) nitrogen | Weight of carbon-containing chemical compound with one or more functional groups containing a (basic) nitrogen | Yield of iso-alpha-acids |
|---|---|---|---|
| entry 1 | pyridine | 0.079 g | 19.2% |
| entry 2 | piperidine | 0.085 g | 24.7% |
| entry 3 | pyrrolidine | 0.071 g | 28.9% |
| entry 4 | dipentylamine | 0.157 g | 25.3% |
| entry 5 | tripropylamine | 0.143 g | 26.1% |
| entry 6 | / | / | 4.2% |

Reaction conditions: molar reactant:(carbon-containing chemical compound with one or more functional groups containing a (basic) nitrogen atom with a lone pair) ratio = 1; 0.36 g reactant; 363 K; 6 h.

EXAMPLE 3

Solvent-free Isomerisation of Alpha-acids (Alpha-acid Feed Containing Alpha-acids and Iso-alpha-acids) with Carbon-containing Chemical Compounds with One or more Functional Groups Containing a (Basic) Nitrogen Atom with a Lone Pair, as Part of a Functional Group in the Carbon-containing Chemical Compound or apart from other Functional Groups in the Carbon-containing Chemical Compound, at 363 K The isomerisation experiments and sample analyses were performed as described in Example 1.

TABLE 3

Solvent-free isomerisation of alpha-acids (alpha-acid feed containing alpha-acids and iso-alpha-acids) with carbon-containing chemical compounds with one or more functional groups containing a (basic) nitrogen atom with a lone pair, as part of a functional group in the carbon-containing chemical compound or apart from other functional groups in the carbon-containing chemical compound, at 363 K

|  | Carbon-containing chemical compound with one or more functional groups containing a (basic) nitrogen | Molecule type/ functional groups | Weight of carbon-containing chemical compound with one or more functional groups containing a (basic) nitrogen | Yield of iso-alpha-acids |
|---|---|---|---|---|
| entry 1 | L-proline | amino acid/ imino acid | 0.115 g | 31.2% |
| entry 2 | glycine | amino acid | 0.075 g | 14.6% |
| entry 3 | D-proline | amino acid/ imino acid | 0.115 g | 33.7% |
| entry 4 | beta-alanine | beta amino acid | 0.089 g | 27.4% |
| entry 5 | niacin | beta amino acid | 0.123 g | 15.7% |
| entry 6 | L-prolinol | amino alcohol | 0.101 g | 22.4% |
| entry 7 | glucosamine | amino sugar | 0.179 g | 19.4% |
| entry 8 | picolinamide | amine + amide group | 0.122 g | 13.7% |
| entry 9 | gly-gly-gly | oligopeptide | 0.063 g | 9.5% |
| entry 10 | polyvinylpyridine | N-containing polymer | 0.105 g | 11.9% |
| entry 11 | / | / | / | 7.6% |

Reaction conditions: molar reactant:(carbon-containing chemical compound with one or more functional groups containing a (basic) nitrogen atom with a lone pair) ratio = 1; 0.36 g reactant; 363 K; 6 h.

At a reaction temperature of 363 K, 0.36 g of alpha-acids was converted with 0.115 g of L-proline (molar reactant:L-proline ratio=1) to iso-alpha-acids with an iso-alpha-acid yield of 31.2% after 6 h (Table 3, entry 1). In the control experiment without addition of a carbon-containing chemical compound with one or more functional groups containing a (basic) nitrogen atom with a lone pair, an iso-alpha-acid yield of 7.6% was obtained under the same reaction conditions (Table 3, entry 11). Under the same reaction conditions, 0.075 g of glycine (molar reactant:glycine ratio=1) resulted in an iso-alpha-acid yield of 14.6% (Table 3, entry 2). Under the same reaction conditions, 0.115 g of D-proline (molar reactant:D-proline ratio=1) resulted in an iso-alpha-acid yield of 33.7% (Table 3, entry 3). Under the same reaction conditions, 0.089 g of beta-alanine (molar reactant:beta-alanine ratio=1) resulted in an iso-alpha-acid yield of 27.4% (Table 3, entry 4). Under the same reaction conditions, 0.123 g of niacin (molar reactant:niacin ratio=1) resulted in an iso-alpha-acid yield of 15.7% (Table 3, entry 5). Under the same reaction conditions, 0.101 g of L-prolinol (molar reactant:L-prolinol ratio =1) resulted in an iso-alpha-acid yield of 22.4% (Table 3, entry 6). Under the same reaction conditions, 0.179 g of glucosamine (molar reactant:glucosamine ratio=1) resulted in an iso-alpha-acid yield of 19.4% (Table 3, entry 7). Under the same reaction conditions, 0.122 g of picolinamide (molar reactant:picolinamide ratio=1) resulted in an iso-alpha-acid yield of 13.7% (Table 3, entry 8). Under the same reaction conditions, 0.063 g of gly-gly-gly (molar reactant:(N-content of gly-gly-gly) ratio=1) resulted in an iso-alpha-acid yield of 9.5% (Table 3, entry 9). Under the same reaction conditions, 0.105 g of polyvinylpyridine (molar reactant:(N-content of polyvinylpyridine) ratio=1) resulted in an iso-alpha-acid yield of 11.9% (Table 3, entry 10).

EXAMPLE 4

Solvent-free Isomerisation of Alpha-acids (Alpha-acid Feed: Hop Extract Enriched in Alpha-acids) with Carbon-containing Chemical Compounds with One or more Functional Groups Containing a (Basic) Nitrogen Atom with a Lone Pair, as Part of a Functional Group in the Carbon-containing Chemical Compound or apart from other Functional Groups in the Carbon-containing Chemical Compound, at 363 K The isomerisation experiments were performed as described in Example 2. The sample analyses were performed as described in Example 1.

At a reaction temperature of 363 K, 0.36 g of alpha-acids was converted with 0.115 g of L-proline (molar reactant:L-proline ratio=1) to iso-alpha-acids with an iso-alpha-acid yield of 24.5% after 6 h (Table 4, entry 1). In the control experiment without addition of a carbon-containing chemical compound with one or more functional groups containing a (basic) nitrogen atom with a lone pair, an iso-alpha-acid yield of 4.2% was obtained under the same reaction conditions (Table 4, entry 7). Under the same reaction conditions, 0.075 g of glycine (molar reactant:glycine ratio=1) resulted in an iso-alpha-acid yield of 11.7% (Table 4, entry 2). Under the same reaction conditions, 0.115 g of D-proline (molar reactant:D-proline ratio=1) resulted in an iso-alpha-acid yield of 27.1% (Table 4, entry 3). Under the same reaction conditions, 0.089 g of beta-alanine (molar reactant:beta-alanine ratio=1) resulted in an iso-alpha-acid yield of 25.3% (Table 4, entry 4). Under the same reaction conditions, 0.101 g of L-prolinol (molar reactant:L-prolinol ratio=1) resulted in an iso-alpha-acid yield of 19.2% (Table 4, entry 5). Under the same reaction conditions, 0.195 g of N-methyl-glucamine (molar reactant:N-methyl-glucamine ratio=1) resulted in an iso-alpha-acid yield of 26.4% (Table 4, entry 6).

TABLE 4

Solvent-free isomerisation of alpha-acids (alpha-acid feed: hop extract enriched in alpha-acids) with carbon-containing chemical compounds with one or more functional groups containing a (basic) nitrogen atom with a lone pair, as part of a functional group in the carbon-containing chemical compound or apart from other functional groups in the carbon-containing chemical compound, at 363 K

| | Carbon-containing chemical compound with one or more functional groups containing a (basic) nitrogen | Molecule type/ functional groups | Weight of carbon-containing chemical compound with one or more functional groups containing a (basic) nitrogen | Yield of iso-alpha-acids |
|---|---|---|---|---|
| entry 1 | L-proline | amino acid/ imino acid | 0.115 g | 24.5% |
| entry 2 | glycine | amino acid | 0.075 g | 11.7% |
| entry 3 | D-proline | amino acid/ imino acid | 0.115 g | 27.1% |
| entry 4 | beta-alanine | beta amino acid | 0.089 g | 25.3% |
| entry 5 | L-prolinol | amino alcohol | 0.101 g | 19.2% |
| entry 6 | N-methyl-glucamine | amino sugar | 0.195 g | 26.4% |
| entry 7 | / | / | / | 4.2% |

Reaction conditions: molar reactant:(carbon-containing chemical compound with one or more functional groups containing a (basic) nitrogen atom with a lone pair) ratio = 1; 0.36 g reactant; 363 K; 6 h.

EXAMPLE 5

Isomerisation of Alpha-ccids (Alpha-acid Feed Containing Alpha-acids and Iso-alpha-acids) in the Presence of Solvents with Carbon-containing Chemical Compounds with One or more Functional Groups Containing a (Basic) Nitrogen Atom with a Lone Pair at 363 K All isomerisation experiments in the presence of solvents were performed in triplicate for statistical reliability. The starting composition of the alpha-acid feed was: 94.1% alpha-acids and 5.9% iso-alpha-acids. 0.36 g of alpha-acid feed was added to a 1 mL volume of a solvent or a solvent mixture. After addition of L-proline, the reaction mixture was stirred and heated to 363 K for 6 h. All reaction vessels were pressurized with 2.0 MPa nitrogen gas.

For the sample analyses, the same HPLC procedure was applied as described in Example 1, except for the sample preparation. The samples were analyzed after dilution in a 5 mL ethanol volume.

At a reaction temperature of 363 K, 0.36 g of alpha-acids was converted with 0.115 g of L-proline (molar reactant:L-proline ratio=1) to iso-alpha-acids with an iso-alpha-acid yield of 31.2% after 6 h (Table 5, entry 1). At a reaction temperature of 363 K, 0.36 g of alpha-acids in 1 mL propylene carbonate was converted with 0.115 g of L-proline (molar reactant:L-proline ratio=1) to iso-alpha-acids with an iso-alpha-acid yield of 33.7% after 6 h (Table 5, entry 2). At a reaction temperature of 363 K, 0.36 g of alpha-acids in 1 mL acetonitrile was converted with 0.115 g of L-proline (molar reactant:L-proline ratio=1) to iso-alpha-acids with an iso-alpha-acid yield of 29.7% after 6 h (Table 5, entry 3). At a reaction temperature of 363 K, 0.36 g of alpha-acids in 1 mL ethyl acetate was converted with 0.115 g of L-proline (molar reactant:L-proline ratio=1) to iso-alpha-acids with an iso-alpha-acid yield of 25.4% after 6 h (Table 5, entry 4).

TABLE 5

Isomerisation of alpha-acids (alpha-acid feed containing alpha-acids and iso-alpha-acids) in the presence of solvents with carbon-containing chemical compounds with one or more functional groups containing a (basic) nitrogen atom with a lone pair at 363 K

| | Solvent | Yield of iso-alpha-acids |
|---|---|---|
| entry 1 | / | 31.2% |
| entry 2 | 1 mL propylene carbonate | 33.7% |
| entry 3 | 1 mL acetonitrile | 29.7% |
| entry 4 | 1 mL ethyl acetate | 25.4% |

Reaction conditions: molar reactant:L-proline ratio = 1; 0.36 g reactant; 0.115 g L-proline; 363 K; 6 h.

EXAMPLE 6

Isomerisation of Alpha-acids (Alpha-acid Feed: Hop Extract Enriched in Alpha-acids) in the Presence of Solvents with Carbon-containing Chemical Compounds with One or more Functional Groups Containing a (Basic) Nitrogen Atom with a Lone Pair at 363 K All isomerisation experiments in the presence of solvents were performed in triplicate for statistical reliability. The starting composition of the alpha-acid feed was: 79.7% alpha-acids, 1.9% iso-alpha-acids and 1.5% beta-acids. 0.45 g of alpha-acid feed (≈0.36 g alpha-acid reactant) was added to varying volumes of solvents. After addition of the carbon-containing chemical compound with one or more functional groups containing a (basic) nitrogen atom with a lone pair, the reaction mixture was stirred and heated to 363 K for 6 h. All reaction vessels were pressurized with 2.0 MPa nitrogen gas.

For the sample analyses, the same HPLC procedure was applied as described in Example 1, except for the sample preparation. The samples were analyzed after fivefold dilution of the reaction mixture in ethanol.

TABLE 6

Isomerisation of alpha-acids (alpha-acid feed: hop extract enriched in alpha-acids) in the presence of solvents with carbon-containing chemical compounds with one or more functional groups containing a (basic) nitrogen atom with a lone pair at 363 K

| | Carbon-containing chemical compound with one or more functional groups containing a (basic) nitrogen | Solvent and solvent volume | Yield of iso-alpha-acids |
|---|---|---|---|
| entry 1 | L-proline | / | 24.5% |
| entry 2 | L-proline | 0.25 mL water | 3.9% |
| entry 3 | L-proline | 0.05 mL ethanol | 27.3% |
| entry 4 | L-proline | 0.25 mL ethanol | 28.1% |
| entry 5 | L-proline | 0.25 mL butanone | 18.5% |
| entry 6 | pyridine | / | 19.2% |
| entry 7 | pyridine | 10 mL water | 14.7% |
| entry 8 | pyridine | 100 mL water (pH ≈ 5) | 5.7% |
| entry 9 | pyridine | 1000 mL water (pH ≈ 5) | 3.3% |
| entry 10 | / | 1000 mL water (pH ≈ 5) | 3.2% |
| entry 11 | L-proline | 1000 mL water (pH ≈ 5) | 3.3% |

Reaction conditions: molar reactant:(carbon-containing chemical compound with one or more functional groups containing a (basic) nitrogen atom with a lone pair) ratio = 1; 0.36 g reactant; 0.115 g L-proline or 0.079 g pyridine; 363 K; 6 h.

At a reaction temperature of 363 K, 0.36 g of alpha-acids was converted with 0.115 g of L-proline (molar reactant:L-proline ratio=1) to iso-alpha-acids with an iso-alpha-acid yield of 24.5% after 6 h (Table 6, entry 1). At a reaction temperature of 363 K, 0.36 g of alpha-acids in 0.25 mL water (purified water) was converted with 0.115 g of L-proline (molar reactant:L-proline ratio=1) to iso-alpha-acids with an iso-alpha-acid yield of 3.9% after 6 h (Table 6, entry 2). At a reaction temperature of 363 K, 0.36 g of alpha-acids in 0.05 mL ethanol was converted with 0.115 g of L-proline (molar reactant:L-proline ratio=1) to iso-alpha-acids with an iso-alpha-acid yield of 27.3% after 6 h (Table 6, entry 3). At a reaction temperature of 363 K, 0.36 g of alpha-acids in 0.25 mL ethanol was converted with 0.115 g of L-proline (molar reactant:L-proline ratio=1) to iso-alpha-acids with an iso-alpha-acid yield of 28.1% after 6 h (Table 6, entry 4). At a reaction temperature of 363 K, 0.36 g of alpha-acids in 0.25 mL butanone was converted with 0.115 g of L-proline (molar reactant:L-proline ratio=1) to iso-alpha-acids with an iso-alpha-acid yield of 18.5% after 6 h (Table 6, entry 5).

At a reaction temperature of 363 K, 0.36 g of alpha-acids was converted with 0.079 g of pyridine (molar reactant:pyridine ratio=1) to iso-alpha-acids with an iso-alpha-acid yield of 19.2% after 6 h (Table 6, entry 6). At a reaction temperature of 363 K, 0.36 g of alpha-acids in 10 mL water (purified water) was converted with 0.079 g of pyridine (molar reactant:pyridine ratio=1) to iso-alpha-acids with an iso-alpha-acid yield of 14.7% after 6 h (Table 6, entry 7). At a reaction temperature of 363 K, 0.36 g of alpha-acids in 100 mL water (pH ≈5) was converted with 0.085 g of pyridine (molar reactant:pyridine ratio=1) to iso-alpha-acids with an iso-alpha-acid yield of 5.7% after 6 h (Table 6, entry 8). At a reaction temperature of 363 K, 0.36 g of alpha-acids in 1000 mL water (pH ≈5) was converted with 0.085 g of pyridine (molar reactant:pyridine ratio=1) to iso-alpha-acids with an iso-alpha-acid yield of 3.3% after 6 h (Table 6, entry 9). At a reaction temperature of 363 K, 0.36 g of alpha-acids in 1000 mL water (pH ≈5) was converted in the absence of a carbon-containing chemical compound with one or more functional groups containing a (basic) nitrogen atom with a lone pair to iso-alpha-acids with an iso-alpha-acid yield of 3.2% after 6 h (Table 6, entry 10). At a reaction temperature of 363 K, 0.36 g of alpha-acids in 1000 mL water (pH ≈5) was converted with 0.115 g of L-proline (molar reactant:L-proline ratio=1) to iso-alpha-acids with an iso-alpha-acid yield of 3.3% after 6 h (Table 6, entry 11).

EXAMPLE 7

Solvent-free Isomerisation of Alpha-acids with Carbon-containing Chemical Compounds with One or more Functional Groups Containing a (Basic) Nitrogen Atom with a Lone Pair at 363 K: Variation of Feed Composition All isomerisation experiments with variations of the feed composition were performed in triplicate for statistical reliability. The starting composition of the alpha-acid feed was: 94.1% alpha-acids and 5.9% iso-alpha-acids. For entry 1 and 2, the reactant feed consisted of 0.36 g of alpha-acid feed and 0.115 g L-proline (molar reactant:L-proline ratio=1) was added. For entry 3 and 4, the reactant feed consisted of 0.27 g of alpha-acid feed and 0.103 g of beta-acid extract, and 0.086 g L-proline (molar reactant:L-proline ratio=1) was added. For entry 5 and 6, the reactant feed consisted of 0.18 g of alpha-acid feed and 0.206 g of beta-acid extract, and 0.058 g L-proline (molar reactant:L-proline ratio=1) was added. For entry 7 and 8, the reactant feed was a hop carbon dioxide extract containing alpha-acids, beta-acids, hop oils, etc.; and to 0.058 g L-proline was added an amount of this hop carbon dioxide extract containing 0.18 g of alpha-acid reactants (molar reactant:L-proline ratio=1).

Thereafter, the reaction mixture were stirred and heated to 363 K for reaction times of 6 h and 20 h. All reaction vessels were pressurized with 0.2 MPa nitrogen gas.

The sample analyses were performed as described in Example 1.

At a reaction temperature of 363 K, 0.36 g of alpha-acids was converted with 0.115 g of L-proline (molar reactant:L-proline ratio=1) to iso-alpha-acids with an iso-alpha-acid yield of 31.2% after 6 h (Table 7, entry 1). At a reaction temperature of 363 K, 0.36 g of alpha-acids was converted with 0.115 g of L-proline (molar reactant:L-proline ratio=1) to iso-alpha-acids with an iso-alpha-acid yield of >90.0% after 20 h (Table 7, entry 2). At a reaction temperature of 363 K, 0.27 g of alpha-acids, in the presence of 0.103 g of beta-acids, was converted with 0.086 g of L-proline (molar reactant:L-proline ratio=1) to iso-alpha-acids with an iso-alpha-acid yield of 33.1% after 6 h (Table 7, entry 3). At a reaction temperature of 363 K, 0.27 g of alpha-acids, in the presence of 0.103 g of beta-acids, was converted with 0.086 g of L-proline (molar reactant:L-proline ratio=1) to iso-alpha-acids with an iso-alpha-acid yield of >90.0% after 20 h (Table 7, entry 4). At a reaction temperature of 363 K, 0.18 g of alpha-acids, in the presence of 0.206 g of beta-acids, was converted with 0.058 g of L-proline (molar reactant:L-proline ratio=1) to iso-alpha-acids with an iso-alpha-acid yield of 32.4% after 6 h (Table 7, entry 5). At a reaction temperature of 363 K, 0.18 g of alpha-acids, in the presence of 0.206 g of beta-acids, was converted with 0.058 g of L-proline (molar reactant:L-proline ratio=1) to iso-alpha-acids with an iso-alpha-acid yield of >90.0% after 20 h (Table 7, entry 6). At a reaction temperature of 363 K, 0.18 g of alpha-acids, present in a hop carbon dioxide extract, was converted with 0.058 g of L-proline (molar reactant:L-proline ratio=1) to iso-alpha-acids with an iso-alpha-acid yield of 38.7% after 6 h (Table 7, entry 7). At a reaction temperature of 363 K, 0.18 g of alpha-acids, present in a hop carbon dioxide extract, was converted with 0.058 g of L-proline (molar reactant:L-proline ratio=1) to iso-alpha-acids with an iso-alpha-acid yield of >90.0% after 20 h (Table 7, entry 8).

TABLE 7

Solvent-free isomerisation of alpha-acids with carbon-containing chemical compounds with one or more functional groups containing a (basic) nitrogen atom with a lone pair at 363 K: variation of feed composition

| | Reactant feed | Weight of L-proline | Reaction time | Yield of iso-alpha-acids |
|---|---|---|---|---|
| entry 1 | 0.36 g of alpha-acid feed | 0.115 g | 6 h | 31.2% |
| entry 2 | 0.36 g of alpha-acid feed | 0.115 g | 20 h | >90.0% |
| entry 3 | 0.27 g of alpha-acid feed + 0.103 g of beta-acid extract | 0.086 g | 6 h | 33.1% |
| entry 4 | 0.27 g of alpha-acid feed + 0.103 g of beta-acid extract | 0.086 g | 20 h | >90.0% |
| entry 5 | 0.18 g of alpha-acid feed + 0.206 g of beta-acid extract | 0.058 g | 6 h | 32.4% |
| entry 6 | 0.18 g of alpha-acid feed + 0.206 g of beta-acid extract | 0.058 g | 20 h | >90.0% |
| entry 7 | 0.18 g of alpha-acids in hop carbon dioxide extract | 0.058 g | 6 h | 38.7% |
| entry 8 | 0.18 g of alpha-acids in hop carbon dioxide extract | 0.058 g | 20 h | >90.0% |

Reaction conditions: molar reactant:L-proline ratio = 1; 363 K.

EXAMPLE 8

Solvent-free Isomerisation of Alpha-acids (Alpha-acid Feed Containing Alpha-acids and Iso-alpha-acids) with Carbon-containing Chemical Compounds with One or more Functional Groups Containing a (Basic) Nitrogen Atom with a Lone Pair at 363 K: Variation of Reaction Temperature and Reactant:(Carbon-containing Chemical Compound with One or more Functional Groups Containing a (Basic) Nitrogen Atom) Ratio The isomerisation experiments and sample analyses were performed as described in Example 1, except for the variations in reaction temperature (348 K, 363 K and 378 K instead of 363 K), reaction time (2 h, 6 h and 8 h instead of 6 h) and molar reactant:L-proline ratio (1, 2 and 4 instead of 1).

TABLE 8

Solvent-free isomerisation of alpha-acids (alpha-acid feed containing alpha-acids and iso-alpha-acids) with carbon-containing chemical compounds with one or more functional groups containing a (basic) nitrogen atom with a lone pair at 363 K: variation of reaction temperature and reactant:(carbon-containing chemical compound with one or more functional groups containing a (basic) nitrogen atom) ratio

| | Reaction temperature | Molar reactant:L-proline ratio | Reaction time | Yield of iso-alpha-acids |
|---|---|---|---|---|
| entry 1 | 348 K | 1:1 | 6 h | 16.7% |
| entry 2 | 363 K | 1:1 | 6 h | 31.2% |
| entry 3 | 363 K | 2:1 | 6 h | 23.1% |
| entry 4 | 363 K | 4:1 | 6 h | 16.9% |
| entry 5 | 378 K | 1:1 | 2 h | 34.1% |
| entry 6 | 378 K | 2:1 | 2 h | 25.2% |
| entry 7 | 378 K | 4:1 | 2 h | 18.5% |
| entry 8 | 378 K | 1:1 | 6 h | >90.0% |

Reaction conditions: 0.36 g reactant; carbon-containing chemical compound with one or more functional groups containing a (basic) nitrogen atom = L-proline.

At a reaction temperature of 348 K, 0.36 g of alpha-acids was converted with 0.115 g of L-proline (molar reactant:L-proline ratio=1) to iso-alpha-acids with an iso-alpha-acid yield of 16.7% after 6 h (Table 8, entry 1). At a reaction temperature of 363 K, 0.36 g of alpha-acids was converted with 0.115 g of L-proline (molar reactant:L-proline ratio=1) to iso-alpha-acids with an iso-alpha-acid yield of 31.2% after 6 h (Table 8, entry 2). Under the same reaction conditions except for the molar reactant:L-proline ratio, iso-alpha-acid yields of 23.1% (Table 8, entry 3) and 16.9% (Table 8, entry 4) were obtained for molar reactant:L-proline ratios of respectively 2 and 4. At a reaction temperature of 378 K, 0.36 g of alpha-acids was converted with 0.115 g of L-proline (molar reactant:L-proline ratio=1) to iso-alpha-acids with an iso-alpha-acid yield of 34.1% after 2 h (Table 8, entry 5). Under the same reaction conditions except for the molar reactant:L-proline ratio, iso-alpha-acid yields of 25.2% (Table 8, entry 6) and 18.5% (Table 8, entry 7) were obtained for molar reactant:L-proline ratios of respectively 2 and 4. At a reaction temperature of 378 K, 0.36 g of alpha-acids was converted with 0.115 g of L-proline (molar reactant:L-proline ratio=1) to iso-alpha-acids with an alpha-acid yield >90.0% after 6 h (Table 8, entry 8).

EXAMPLE 9

Solvent-free Isomerisation of Alpha-acids with Carbon-containing Chemical Compounds with One or more Functional Groups Containing a (Basic) Nitrogen Atom with a Lone Pair at 363 K: Determination of Cis:Trans Ratio and Long-term Stability of Iso-alpha-acid Products For the determination of the cis:trans ratios of the iso-alpha-acid products, UPLC analyses were applied. The UPLC device comprised a binary pump, vacuum degasser, autosampler, column thermostat, and diode array detector. One Acquity HSS C18 column (150 mm length×2.1 mm inner diameter, packed with 1.8 µm particles) was used. The mobile phase consisted of water acidified to a pH of 2.8 with phosphoric acid (A solvent) and acetonitrile (B solvent). The flow rate was set at 0.5 mL/min and isocratic solvent gradient elution was performed: 48% A and 52% B. The column temperature was maintained at 308 K. 5 µL volumes of filtered samples were injected. The UV detection was performed at 270 nm. The samples from the solvent-free isomerisation experiments were analyzed after 100-fold dilution with 0.5% $H_2SO_4$ in methanol.

For alpha-acid isomerisations with L-proline at 363 K (as in Table 7, entry 2) and at 378 K (as in Table 8, entry 8) with an iso-alpha-acid yield of >90.0%, the cis-fraction of the fresh iso-alpha-acid products was in each case >75%. In the alpha-acid isomerisations performed without the addition of a carbon-containing chemical compound with one or more functional groups containing a (basic) nitrogen atom with a lone pair at 363 K, a cis:trans ratio for the iso-alpha-acid products of ≈66:34 was observed.

HPLC and UPLC analysis revealed that, after 50 days of cool storage (278 K), the fraction of cis-iso-alpha-acids in the iso-alpha-acid product pool was still >75%.

EXAMPLE 10

Hydrogenation of the Reaction Product Phase Obtained from the Solvent-free Isomerisation of Alpha-acids with Carbon-containing Chemical Compounds with One or more Functional Groups Containing a (Basic) Nitrogen Atom with a Lone Pair The iso-alpha-acid reactant feed used in this example was a mixture of L-proline and iso-alpha-acids, which contained 0.36 g of iso-alpha-acids. This feed mixture was prepared following the procedure of Table 8, entry 8. 0.04 g of 5% Ru/C catalyst (≈0.02 mmol Ru) was added to this feed mixture (≈1 mmol iso-alpha-acids) for the Ru catalyzed iso-alpha-acid hydrogenation experiments. 0.04 g of 5% Pd/C (≈0.02 mmol Pd) was added to this feed mixture (≈1 mmol iso-alpha-acids) for the Pd catalyzed iso-alpha-acid hydrogenations. Next, the reaction mixture was stirred and heated to 348 K, for a reaction time of 24 h for the hydrogenation experiments with the Ru containing catalyst and for 20 h for the hydrogenation experiments with the Pd based catalyst. All reaction vessels were pressurized with 2.0 MPa hydrogen gas. After the hydrogenation reaction, the powder catalysts (Ru/C and Pd/C) were separated from the reaction mixture by centrifugation.

The sample analyses were, after separation of the hydrogenation catalysts from the reaction mixture, performed as described in Example 1, and the UV detection of the tetrahydro-iso-alpha-acids and hexahydro-iso-alpha-acids was also performed at 256 nm.

At a reaction temperature of 348 K, 0.36 g of iso-alpha-acid reactant was converted with 0.04 g of the 5% Ru/C catalyst (molar reactant:ruthenium ratio=50) to hexahydro-iso-alpha-acids with a hexahydro-iso-alpha-acid yield of >90% after 24 h (Table 10, entry 1). At the same reaction temperature, the same amount of iso-alpha-acid reactants was converted with 0.04 g of the 5% Pd/C catalyst (molar reactant:palladium ratio=50) with a tetrahydro-iso-alpha-acid yield of >90% after 20 h (Table 10, entry 2).

TABLE 10

Hydrogenation of the reaction product phase obtained from the solvent-free isomerisation of alpha-acids with carbon-containing chemical compounds with one or more functional groups containing a (basic) nitrogen atom with a lone pair

| | Reaction time | Catalyst | Conversion of iso-alpha-acids | Product selectivity |
|---|---|---|---|---|
| entry 1 | 24 h | 5% Ru/C | >99% | >90% hexahydro-iso-alpha-acids |
| entry 2 | 20 h | 5% Pd/C | >99% | >90% tetrahydro-iso-alpha-acids |

Reaction conditions: molar reactant:ruthenium ratio = 50; molar reactant:palladium ratio = 50; 0.36 g iso-alpha-acid reactant; 0.04 g catalyst; 348 K.

The invention claimed is:

1. A process for the isomerization of hop alpha-acids to hop iso-alpha-acids comprising:
   isomerizing hop alpha-acids to hop iso-alpha-acids by mixing a hop alpha-acid containing feed with at least one carbon-containing chemical compound with one or more functional groups containing a nitrogen atom, with a lone electron pair, with a pKb value below 5;
   wherein the concentration of the alpha-acids in the reaction mixture at the start of the isomerization reaction is at least 0.5 weight %;
   wherein the isomerizing step is prior to wort boiling;
   wherein the isomerizing step is carried out in an aqueous reaction medium having a pH greater than 6.5 and;
   wherein said process yields an isomerized product.

2. The process according to claim 1, wherein said hop alpha-acid containing feed is a hop extract.

3. The process according to claim 1, wherein said carbon-containing chemical compound with one or more functional groups containing a nitrogen atom with a pKb value below 5 is selected from the group consisting of amino acids, ester compounds derived from an amino acid, amide compounds derived from an amino acid, salt compounds derived from an amino acid, amino phenols, amino alcohols, amino sugars, amines, imines, oximes, hydroxylamines, amidines, guanidines, amides, imides, ureas, pyrimidines, purines, and (functionalized) oligomeric or polymeric derivatives of these compounds; and wherein these compounds are non-cyclic (aliphatic or unsaturated carbon side chains), cyclic (saturated or unsaturated rings), or heterocyclic (saturated or unsaturated rings).

4. The process according to claim 3 wherein said carbon-containing chemical compound with one or more functional groups containing a nitrogen atom with a pKb value below 5 is a compound generally present in beer products or naturally occurring in the human body.

5. The process according to claim 3, wherein said amino acid is an alpha amino acid with D-stereoisomer configuration, an alpha amino acid with L-stereoisomer configuration, a beta amino acid, or a gamma amino acid.

6. The process according to claim 5 wherein said amino acid is L-proline or beta-alanine.

7. The process according to claim 5 where in the isomerization reaction occurs in the presence of water and wherein the mass ratio of said amino acid to water is at least 5:1 in the reaction mixture.

8. The process according to claim 1, wherein the isomerization reaction occurs under an oxygen-free atmosphere.

9. The process according to claim 1, wherein the isomerization reaction occurs at a temperature of at least 278 K.

10. The process according to claim 9, wherein the isomerization reaction is carried out at a temperature between 323 K and 383 K.

11. The process according to claim 1 further comprising performing a hydrogenation and/or reduction reaction.

12. The process according to claim 11, wherein said hydrogenation and/or reduction reaction is carried out in the presence of hydrogen with heterogeneous metal based catalysts, either in the absence or in the presence of a solvent, at a temperature of at least 278 K.

13. The process according to claim 1, wherein at the start of the isomerization n reaction the molar ratio of alpha-acids to the nitrogen content of the carbon-containing chemical compound(s) with one or more functional groups containing a nitrogen atom with a pKb value below 5 is between 20:1 and 1:10.

14. The process according to claim 1, wherein the concentration of the alpha-acids in the reaction mixture at the start of the isomerization reaction is at least 1 weight %.

15. A process for the isomerization of hop alpha-acids to hop iso-alpha-acids in a brewing process, comprising:

isomerizing hop alpha-acids to hop iso-alpha-acids by mixing a feed comprising hop alpha-acids with at least one carbon-containing chemical compound, said carbon-containing chemical compound comprising one or more functional groups, said functional groups comprising a nitrogen atom, a lone electron pair, and a pKb value below 5;

wherein the concentration of the alpha-acids in the reaction mixture at the start of the isomerization reaction is at least 0.5 weight %;

wherein the isomerization step is carried out in an aqueous reaction medium having a pH greater than 6.5 and wherein said isomerizing step yields an isomerized product;

said brewing process further comprising a wort boiling step, wherein said wort boiling step occurs after said isomerization step.

16. The process of claim 15, wherein the isomerization reaction is carried out in an aqueous reaction medium having a pH of more than 7.5.

17. The process of claim 1, wherein the isomerization reaction is carried out in an aqueous reaction medium having a pH of more than 7.5.

18. A process comprising:

an isomerization step and a wort boiling step;

said isomerization step comprising:

isomerizing hop alpha-acids to hop iso-alpha-acids by mixing a hop alpha-acid containing feed with at least one carbon-containing chemical compound with one or more functional groups containing a nitrogen atom, with a lone electron pair, with a pKb value below 5;

wherein the concentration of the alpha-acids in the reaction mixture at the start of the isomerization reaction is at least 0.5 weight %; wherein the isomerizing step is carried out in an aqueous reaction medium having a pH greater than 6.5 and wherein said isomerization step yields an isomerized product; and wherein said isomerization step and said wort boiling step are separate.

* * * * *